Figure 1:
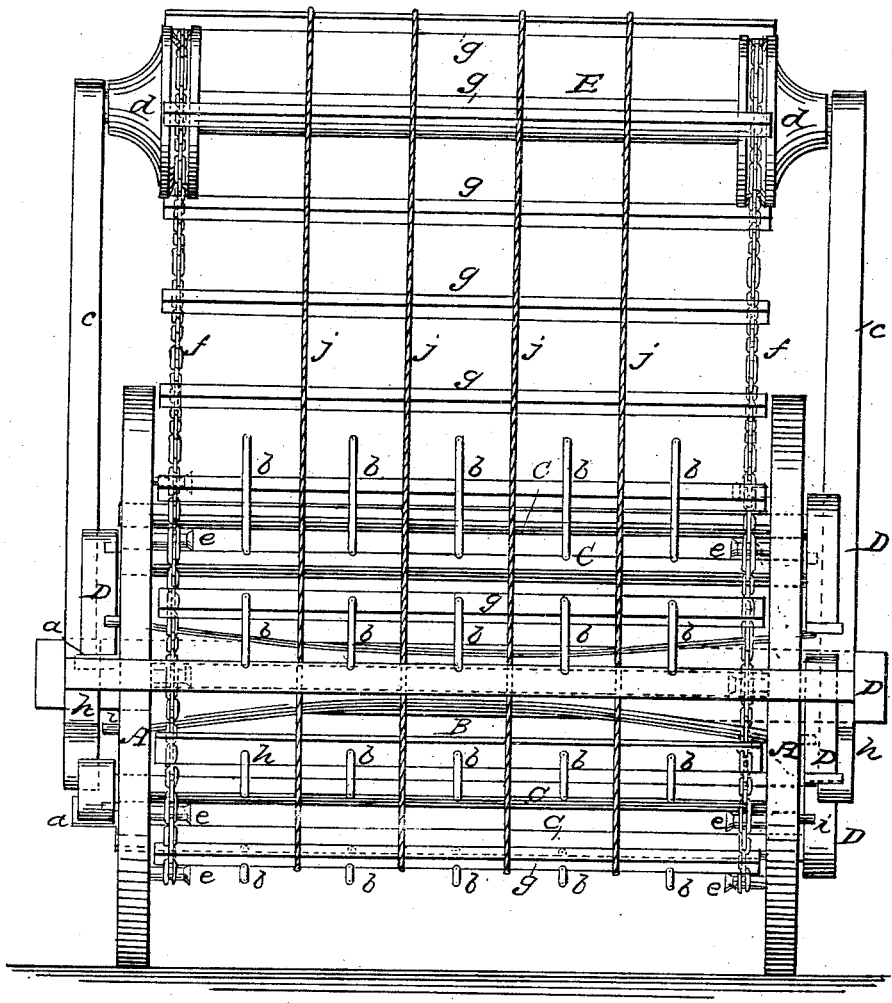

J. W. FOUST.
Hay Loader.

No. 36,947.

2 Sheets—Sheet 1.

Patented Nov. 18, 1862.

WITNESSES
J W Coombs
J M Reed

INVENTOR
J. W. Foust
per Munn & Co.
Attorneys

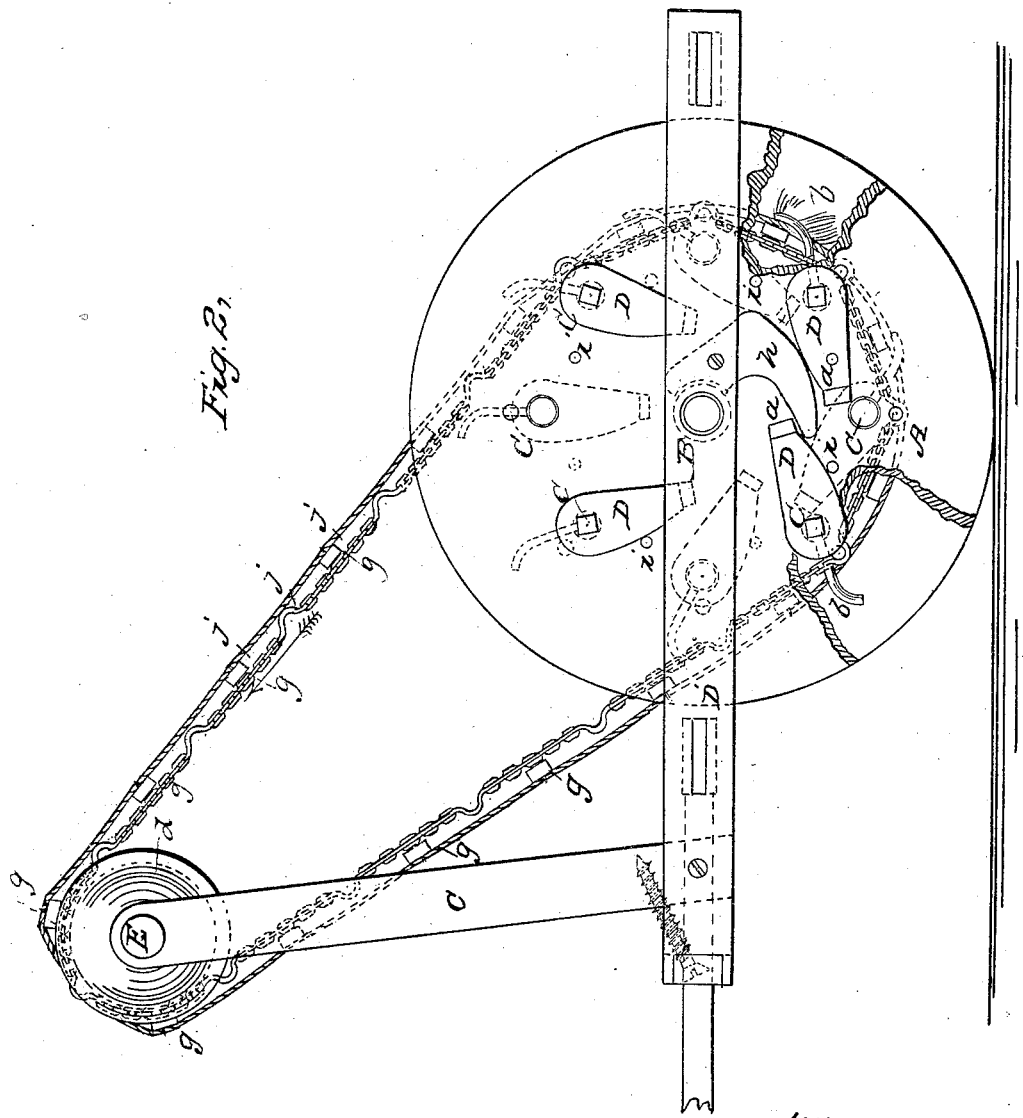

UNITED STATES PATENT OFFICE.

J. W. FOUST, OF HAMMONDSBURG, PENNSYLVANIA.

IMPROVEMENT IN HAY-LOADING MACHINES.

Specification forming part of Letters Patent No. 36,947, dated November 18, 1862.

*To all whom it may concern:*

Be it known that I, J. W. FOUST, of Hammondsburg, in the county of Crawford and State of Pennsylvania, have invented a new and Improved Device for Loading Wagons with Hay direct from the Windrow in the Field; and I do hereby declare that the following is a full, clear, and exact description of the same, reference being had to the accompanying drawings, making a part of this specification, in which—

Figure 1 is a back view of my invention in elevation. Fig. 2 is a side view of the same, partly in section.

Similar letters of reference indicate corresponding parts in the two figures.

The object of this invention is to obtain a device which may be attached to a wagon, and so arranged as to rake and carry up the hay from the windrow and deposit it on the wagon as the latter is drawn along, thereby greatly facilitating the loading of the wagon and dispensing with considerable labor.

To this end the invention consists in the employment or use of revolving rakes in connection with endless chains having slots or bars attached and arranged with the revolving rakes, as hereinafter fully shown and described.

To enable those skilled in the art to fully understand and construct my invention, I will proceed to describe it with reference to the drawings.

A A represent two circular heads or wheels, which are placed on a shaft, B, and permanently secured to it.

C represents a series of shafts the ends of which are fitted loosely in the heads A A. These shafts C are placed in a circle concentric with the wheels A, and at one end they pass through the wheels A, and have each an arm, D, attached, said arms having a weight, $a$, at their lower or outer ends. All of the shafts C do not pass through the same wheel, A. Every alternate shaft passes through one wheel, and the intermediate shafts through the other one. The shafts C have rake-teeth $b$ attached to them at a suitable distance apart. These teeth are slightly curved, as shown by the dotted lines in Fig. 1.

D' is a rectangular frame, in which the axle or shaft B is fitted, the wheels A being within the frame D'. To the front part of the frame D' there are attached two bars, $c\ c$, which are inclined slightly from a vertical position, and have a shaft, E, fitted between their upper parts. On the shaft E there are placed two pulleys, $d\ d$, around which and pins $e$, at the inner sides of the wheels A A, chains $f\ f$ pass. The pins $e$ are driven into the inner sides of the wheels A, so as to serve as drums or pulleys for the chains, and the latter are connected by bars or slots $q$, as shown clearly in Fig. 1.

To each side of the frame D' there is attached a pendent curved or hook-shaped bar, $h$, and in the outer side of each wheel A there are driven pins $i$, which serve as stops or supports for the arms D of the shafts C, said pins being in the form of a circle and at such a distance from the arms D as to hold or sustain them when passing around with the wheels in front of the shaft or axle B.

The bars or slats $q$ have cords $j$ attached to them, which are parallel with each other and the chains $f\ f$, as shown in Fig. 1.

The operation is as follows: The frame D' is attached to the back part of the wagon to be loaded, and, with the wagon, is drawn directly over the windrow, the wheels being at each side of it. As the frame D' moves along, the wheels A of course rotate, and the chains $f\ f$, with the bars or slats $g$, move in the direction indicated by the arrow in Fig. 2. As the teeth $b$ of the several shafts C pass under the shaft or axle B, they rake up the hay or catch it, and at this time the arms D come in contact with the bars $h$, which cause the shafts C to make a greater revolution, throwing up the teeth, with their load transfixed to them. The hay is carried up at the back of the shaft or axle B, and the hay is stripped from the teeth by the bars or slats $g$, and is carried up by them over the wagon, into which it is discharged as the bars or slats pass over the pulleys $d\ d$. The pins $i$, it will be seen, prevent the arms D from passing beyond the reach of the bars h.

Having thus described my invention, what I claim, and desire to secure by Letters Patent, is—

The revolving rakes formed of the teeth b, attached to wheels A, and provided with the arms D, in combination with the pendent bars h, pins i or their equivalents, and the endless carrier formed of the chains f f, the cross bars or slats g, and the cords j, all arranged, as shown, with the frame D', to operate as and for the purpose herein set forth.

J. W. FOUST.

Witnesses:
 C. P. BAKER,
 WM. TAYLOR.